(12) United States Patent
Cho et al.

(10) Patent No.: US 12,100,994 B2
(45) Date of Patent: Sep. 24, 2024

(54) BLDC MOTOR

(71) Applicant: Samsung Electronics Co., Ltd., Suwon-si (KR)

(72) Inventors: Jinwoo Cho, Suwon-si (KR); Wonsoo Kang, Suwon-si (KR); Jimin Kim, Suwon-si (KR); Keeyeon Cho, Suwon-si (KR); Jinwoo Han, Suwon-si (KR); Woong Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 74 days.

(21) Appl. No.: 16/951,535

(22) Filed: Nov. 18, 2020

(65) Prior Publication Data

US 2021/0159747 A1 May 27, 2021

(30) Foreign Application Priority Data

Nov. 26, 2019 (KR) .......................... 10-2019-0153539

(51) Int. Cl.
*H02K 1/27* (2022.01)
*H02K 1/2733* (2022.01)
(Continued)

(52) U.S. Cl.
CPC ....... *H02K 1/2733* (2013.01); *H02K 2213/03* (2013.01)

(58) Field of Classification Search
CPC .... H02K 1/2733; H02K 1/2726; H02K 1/278; H02K 1/2781; H02K 2213/03;
(Continued)

(56) References Cited

U.S. PATENT DOCUMENTS 5,593,287 A * 1/1997 Sadakata ............... F04C 11/008
417/366
6,047,461 A  4/2000 Miura et al.
(Continued)

FOREIGN PATENT DOCUMENTS

EP    3261223    12/2017
EP    3547504    10/2019
(Continued)

OTHER PUBLICATIONS

Machine Translation of WO 2014029629 (Year: 2014).*
(Continued)

*Primary Examiner* — Thomas Truong
(74) *Attorney, Agent, or Firm* — STAAS & HALSEY LLP

(57) ABSTRACT

A brushless direct current (BLDC) motor includes a rotor having a cylindrical permanent magnet to which a shaft is centrally coupled, and supported to rotate on the shaft. An annular stator surrounds the rotor and includes a plurality of teeth and a wound coil to generate an electromagnetic field. The permanent magnet includes a stress reducing portion, which is provided at opposite end portions thereof, and which has a shape having a mass or a volume which is smaller than a mass or a volume per unit length in an axial direction of a portion of the permanent magnet other than the opposite end portions, to reduce centrifugal stress caused by spinning of the rotor.

12 Claims, 15 Drawing Sheets
(2 of 15 Drawing Sheet(s) Filed in Color)

(51) Int. Cl.
 *H02K 3/52* (2006.01)
 *H02K 21/16* (2006.01)
(58) Field of Classification Search
 CPC .......... H02K 7/14; H02K 3/522; H02K 21/16; H02K 29/00; A47L 9/22
 USPC .................................................. 310/51, 261.1
 See application file for complete search history.

(56) References Cited

U.S. PATENT DOCUMENTS

| | | | | |
|---|---|---|---|---|
| 9,954,415 | B2* | 4/2018 | Hidaka | H02K 1/02 |
| 2006/0017343 | A1* | 1/2006 | Ohata | H02K 1/278 |
| | | | | 310/156.43 |
| 2007/0052310 | A1* | 3/2007 | Sakai | F04D 13/064 |
| | | | | 310/43 |
| 2008/0031756 | A1* | 2/2008 | Hwang | F04C 23/008 |
| | | | | 62/115 |
| 2008/0278018 | A1* | 11/2008 | Achor | F02M 37/08 |
| | | | | 29/598 |
| 2009/0001826 | A1* | 1/2009 | Suzuki | H02K 1/2733 |
| | | | | 310/261.1 |
| 2011/0241469 | A1* | 10/2011 | Kjeldsteen | H02K 15/03 |
| | | | | 29/598 |
| 2014/0132103 | A1* | 5/2014 | Gomyo | G01N 27/04 |
| | | | | 310/156.08 |
| 2014/0184008 | A1* | 7/2014 | Ryoo | H02K 1/278 |
| | | | | 310/156.22 |
| 2014/0366683 | A1 | 12/2014 | Pullen | |
| 2016/0065014 | A1* | 3/2016 | Bott | H01F 7/021 |
| | | | | 310/156.01 |
| 2016/0211719 | A1* | 7/2016 | Hidaka | H02K 1/02 |
| 2018/0159402 | A1* | 6/2018 | Lee | H02K 1/2726 |
| 2019/0020235 | A1* | 1/2019 | Horng | H02K 7/003 |
| 2019/0341834 | A1* | 11/2019 | Petschik | H02K 1/2733 |
| 2020/0021173 | A1* | 1/2020 | Kebukawa | H02K 3/522 |
| 2020/0195088 | A1* | 6/2020 | Lee | H02K 7/04 |
| 2021/0159747 | A1* | 5/2021 | Cho | H02K 1/2733 |
| 2022/0021255 | A1* | 1/2022 | Iijima | H02K 1/30 |

FOREIGN PATENT DOCUMENTS

| | | | | |
|---|---|---|---|---|
| JP | S53-58608 | | 5/1978 | |
| JP | 9-56095 | | 2/1997 | |
| JP | 2002-233088 | | 8/2002 | |
| JP | 2019-122084 | | 7/2019 | |
| JP | 2019-161783 | | 9/2019 | |
| KR | 2000-0032329 | | 6/2000 | |
| KR | 10-2008-0095647 | | 10/2008 | |
| WO | 2010/098046 | | 9/2010 | |
| WO | WO-2010098046 | A1* | 9/2010 | A47L 5/22 |
| WO | WO-2014029629 | A2* | 2/2014 | H02K 1/278 |
| WO | WO-2017133784 | A1* | 8/2017 | H02K 1/2733 |
| WO | WO-2020188006 | A1* | 9/2020 | H02K 1/278 |

OTHER PUBLICATIONS

Watanabe, WO 2010098046 A1, English machine translation (Year: 2013).*
International Search Report and Written Opinion of the International Searching Authority dated Mar. 4, 2021 from International Application No. PCT/KR2020/016314, 9 pages.
Extended European Search Report dated Nov. 30, 2022 for European Application No. 20892911.7.
Korean Office Action dated Apr. 2, 2024 for Korean Application No. 10-2019-0153539.

* cited by examiner

FIG. 9

| SAFETY RATE BASED ON SHAPE OF STRESS REDUCING PORTION @ 150000 rpm | | | |
|---|---|---|---|
| L1 | L2 | STRESS | SAFETY RATE |
| 0 | 0 | 18.2 | 1.10 |
| 1.5 | 1.5 | 10.4 | 1.92 |
| 1.5 | 1.3 | 11.1 | 1.80 |
| 1.5 | 1.1 | 12 | 1.67 |
| 1.5 | 0.9 | 12.65 | 1.58 |

FIG. 10

| SAFETY RATE BASED ON SHAPE OF STRESS REDUCING PORTION @ 130000 rpm | | | |
|---|---|---|---|
| L1 | L2 | STRESS | SAFETY RATE |
| 0 | 0 | 13.67 | 1.46 |
| 1.5 | 1.5 | 7.81 | 2.56 |
| 1.5 | 1.3 | 8.34 | 2.40 |
| 1.5 | 1.1 | 9.01 | 2.22 |
| 1.5 | 0.9 | 9.50 | 2.10 |

BLDC MOTOR

CROSS-REFERENCE TO RELATED THE APPLICATION

This application is based on and claims priority under 35 U.S.C. § 119 to Korean Patent Application No. 10-2019-0153539 filed on Nov. 26, 2019 in the Korean Intellectual Property Office, the disclosure of which is incorporated by reference herein in its entirety.

BACKGROUND

Field

The disclosure relates to a brushless direct current (BLDC) motor, and more particularly to improvement in a cylindrical permanent magnet of a BLDC motor for a cleaner, which runs at high speed.

Description of the Related Art

Recently, a high-performance wireless cleaner has been widely used for its ease of use. The wireless cleaner employs a brushless direct current (BLDC) motor that has a long life and is able to be miniaturized and run at high speed.

The BLDC motor includes a rotor with a cylindrical permanent magnet coupled to a rotary shaft, and a stator with a coil wound around a yoke spaced apart from the outer circumferential surface of the cylindrical permanent magnet. The cylindrical permanent magnet used in the BLDC motor may be broken and scattered by excessive centrifugal-stress caused by high-speed spinning. To prevent this, the outer circumferential surface of the permanent magnet may be reinforced with a lightweight and strong carbon tube. However, the reinforcement of the outer circumferential surface of the permanent magnet with the carbon tube not only requires a complicated and difficult process, but also costs high enough to account for most of the cost of the BLDC motor.

Therefore, the BLDC motor for the wireless cleaner needs to be designed to prevent the permanent magnet from being broken and scattered even while running at high speed, and reduce its own weight and manufacturing costs.

SUMMARY

An aspect of the disclosure is to provide an inexpensive brushless direct current (BLDC) motor that prevents a permanent magnet from being broken and scattered even while running at high speed.

According to an embodiment of the disclosure, there is provided a brushless direct current (BLDC) motor. The BLDC motor includes: a rotor including a shaft and a cylindrical permanent magnet into which the shaft is centrally coupled, and supported to turn around the shaft; and an annular stator including a plurality of teeth around which a coil is wound to generate an electromagnetic field, and surrounding the rotor. The permanent magnet includes a stress reducing portion, which is provided at opposite end portions thereof and which has a shape of which a mass or volume is smaller than a mass or volume per unit length in an axial direction of a portion other than the opposite end portions, to reduce centrifugal stress caused by spinning of the rotor.

The rotor may be configured to run at 100,000 or more revolutions per minutes (RPM).

The permanent magnet may be configured to have a diameter of 6 mm or greater.

The shape may include a length in a radial direction, which is greater than or equal to one third of a thickness of the portion of the permanent magnet other than the opposite end portions in the radial direction.

The shape may include a length in an axial direction, which is greater than or equal to one third of a thickness of the portion of the permanent magnet other than the opposite end portions in the radial direction The shape may include a tapering shape inclined from an outer circumferential surface of the permanent magnet toward an axial-directional end portion.

The tapering shape may be linearly inclined from the outer circumferential surface of the permanent magnet toward the axial-directional end portion.

The tapering shape may be inclined with a predetermined radius curvature from the outer circumferential surface of the permanent magnet toward the axial-directional end portion.

The predetermined radius curvature may be greater than or equal to one third of the thickness of the portion of the permanent magnet other than the opposite end portions in the radial direction.

The predetermined radius curvature may include complex curvatures.

The shape may include a first shape evenly extended with a first thickness smaller than a thickness of a portion other than the opposite end portions in a radial direction of the permanent magnet, and a second shape evenly extended with a second thickness smaller than the first thickness.

The shape may include a third shape evenly extended with a first thickness smaller than a thickness of a portion other than the opposite end portions in a radial direction of the permanent magnet, and a fourth shape inclined toward an axial-direction end portion.

An axial-direction end of the stress reducing portion may be provided at a position overhanging an axial-direction end portion of the stator.

A safety value of the centrifugal stress may be greater than or equal to a safety rate of 2.0 with regard to the centrifugal stress of the permanent magnet.

BRIEF DESCRIPTION OF THE DRAWINGS

The patent or application file contains at least one drawing executed in color. Copies of this patent or patent application publication with color drawings will be provided by the Office upon request and payment of the necessary fee. The above and/or the aspects will become apparent and more readily appreciated from the following description of exemplary embodiments, taken in conjunction with the accompanying drawings, in which:

FIG. 9 is a table of safety rates based on ratios of a first length L1 in a radial direction and a second length L2 in an axial direction of a mass reducing shape at 150,000 revolutions per minute (RPM);

FIG. 10 is a table of safety rates based on a ratio of a first length L1 in a radial direction and a second length L2 in an axial direction of a mass reducing shape at 130,000 RPM;

DETAILED DESCRIPTION OF EXEMPLARY EMBODIMENTS

Below, embodiments of the disclosure will be described in detail with reference to accompanying drawings, to be easily carried out by a person having an ordinary skill in the art. The disclosure may be embodied in various different forms, and not limited to the embodiment set forth herein. For clarity of description, like numerals refer to like elements throughout.

In the disclosure, terms "have," "may have," "include," "may include," etc. indicate the presence of corresponding features (e.g. a numeral value, a function, an operation, or an element such as a part, etc.), and do not exclude the presence of additional features.

In the disclosure, terms "A or B", "at least one of A or/and B", "one or more of A or/and B" or the like may include all possible combinations of elements enumerated together. For example, "A or B", "at least one of A and B", or "at least one of A or B" may refer to all of the cases of (1) including at least one A, (2) including at least one B, or (3) including all of at least one A and at least one B.

In the disclosure, terms "first", "second", etc. are used only to distinguish one element from another, and singular forms are intended to include plural forms unless otherwise mentioned contextually.

In addition, in the disclosure, terms "upper", "lower", "left", "right", "inside", "outside", "inner", "outer", "front", "rear", etc. are defined with respect to the accompanying drawings, and do not restrict the shape or location of the elements.

Further, in the disclosure, the expression of "configured to (or set to)" may for example be replaced with "suitable for," "having the capacity to," "designed to," "adapted to," "made to," or "capable of" according to circumstances. Also, the expression of "configured to (or set to)" may not necessarily refer to only "specifically designed to" in terms of hardware. Instead, the "device configured to" may refer to "capable of" along with other devices or parts in a certain circumstance.

A brushless direct current (BLDC) motor 10 according to various embodiments of the disclosure is applicable to various electronic devices such as a wireless cleaner, a robot cleaner, a wired cleaner, an industrial cleaner, a compressor, a drier, an air conditioner, an electric fan, a drone, an electric scooter, etc.

Below, a structure of a BLDC motor assembly 1 according to an embodiment of the disclosure will be described with reference to the accompanying drawings.

Figure 1:
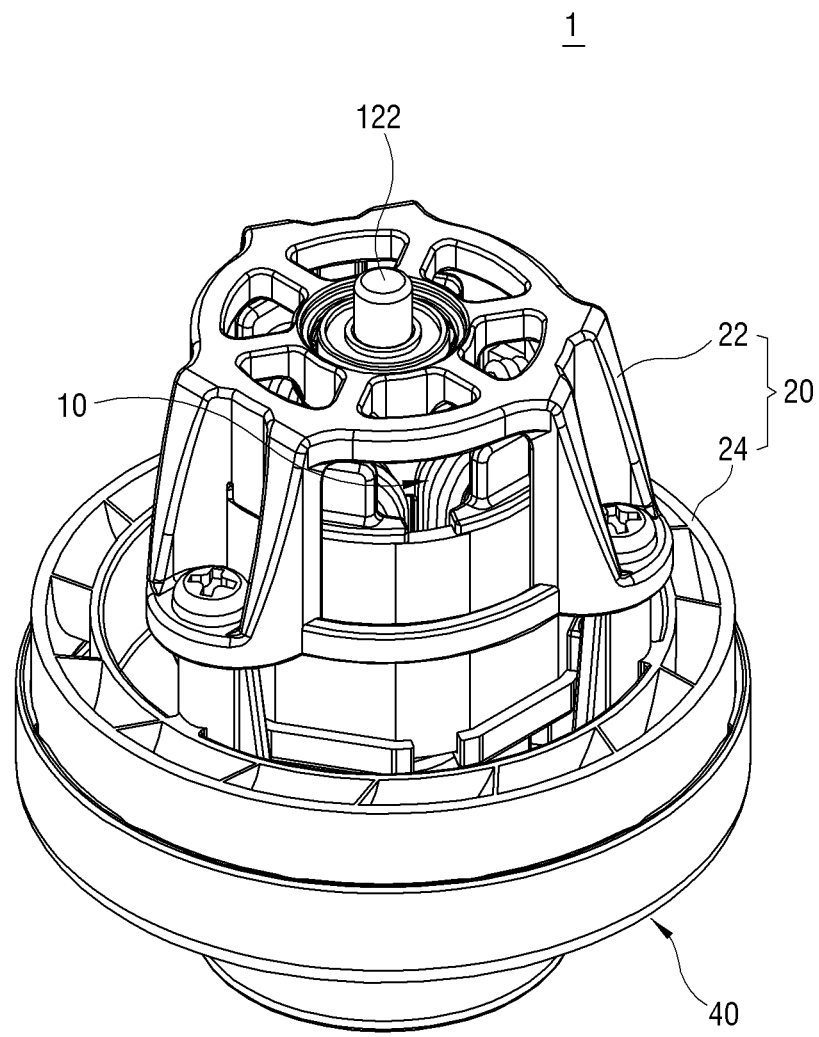
FIG. 1 is a perspective view of a brushless direct current (BLDC) motor assembly according to a first embodiment of the disclosure.
Figure 2:
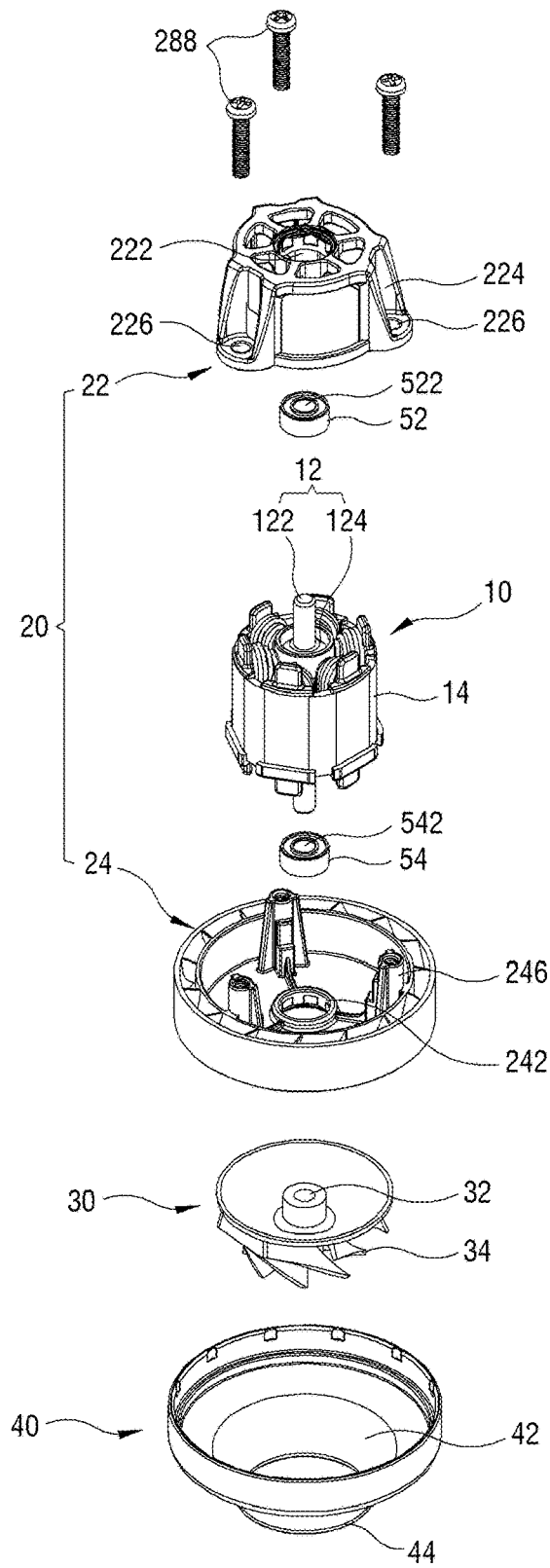
FIG. 2 is an exploded perspective view of the BLDC motor assembly of FIG. 1.

FIG. 1 is a perspective view of the BLDC motor assembly 1 according to a first embodiment of the disclosure, and FIG. 2 is an exploded perspective view of the BLDC motor assembly 1 of FIG. 1.

Referring to FIGS. 1 and 2, the BLDC motor assembly 1 may include a motor 10, a motor cover 20, a fan 30, and a fan cover 40.

The motor 10 may include a rotor 12, which includes a shaft 122 and a cylindrical permanent magnet 124 coupled to the shaft 122, and a stator 14 surrounding the rotor 12.

The rotor 12 may spin due to interaction between a rotating magnetic field generated by applying an electric current to the stator 14 provided with a plurality of winding coils and a magnetic field produced by the permanent magnet 124 of the rotor 12.

The motor cover 20 may rotatably accommodate and support the motor 10. The motor cover 20 may include a first motor cover 22 rotatably supporting a first side of the shaft 122, and a second motor cover 24 rotatably supporting a second side of the shaft 122.

The first motor cover 22 may include a first shaft hole 222 through which the first side of the shaft 122 passes, a plurality of openings 224 opened to pass inhaled air therethrough, and a first screw hole 226 used in being fastened to the second motor cover 24.

A first bearing bushing 52 may be inserted in the first shaft hole 222. The first bearing bushing 52 may be formed with a shaft insertion hole 522 at the center thereof. The first side of the shaft 122 may be inserted and rotatably supported in the shaft insertion hole 522 of the first bearing bushing 52.

The second motor cover 24 may include a second shaft hole 242 through which the second side of the shaft 122 passes, and a second screw hole 246 used in being fastened to the first motor cover 22.

A second bearing bushing 54 may be inserted in the second shaft hole 242. The second bearing bushing 54 may be formed with a shaft insertion hole 542 at the center thereof. The second side of the shaft 122

The second side of the shaft 122 may be inserted and rotatably supported in the shaft insertion hole 542 of the second bearing bushing 54.

The first motor cover 22 and the second motor cover 24 may be coupled to each other by fastening a screw 288 to the first screw hole 226 and the second screw hole 246.

The fan 30 may include a shaft supporter 32 for holding and supporting the second side of the shaft 122, and a plurality of wings 34 for inhaling or exhaling air.

The fan cover 40 may include a fan accommodating portion 42 to accommodate the fan 30 therein without contact, and an air passing portion 44. The fan cover 40 may be coupled to the second motor cover 24 while accommodating the fan 30.

The air passing portion 44 allows air, which is inhaled or exhaled by revolving of the fan 30, to pass therethrough.

Figure 3:
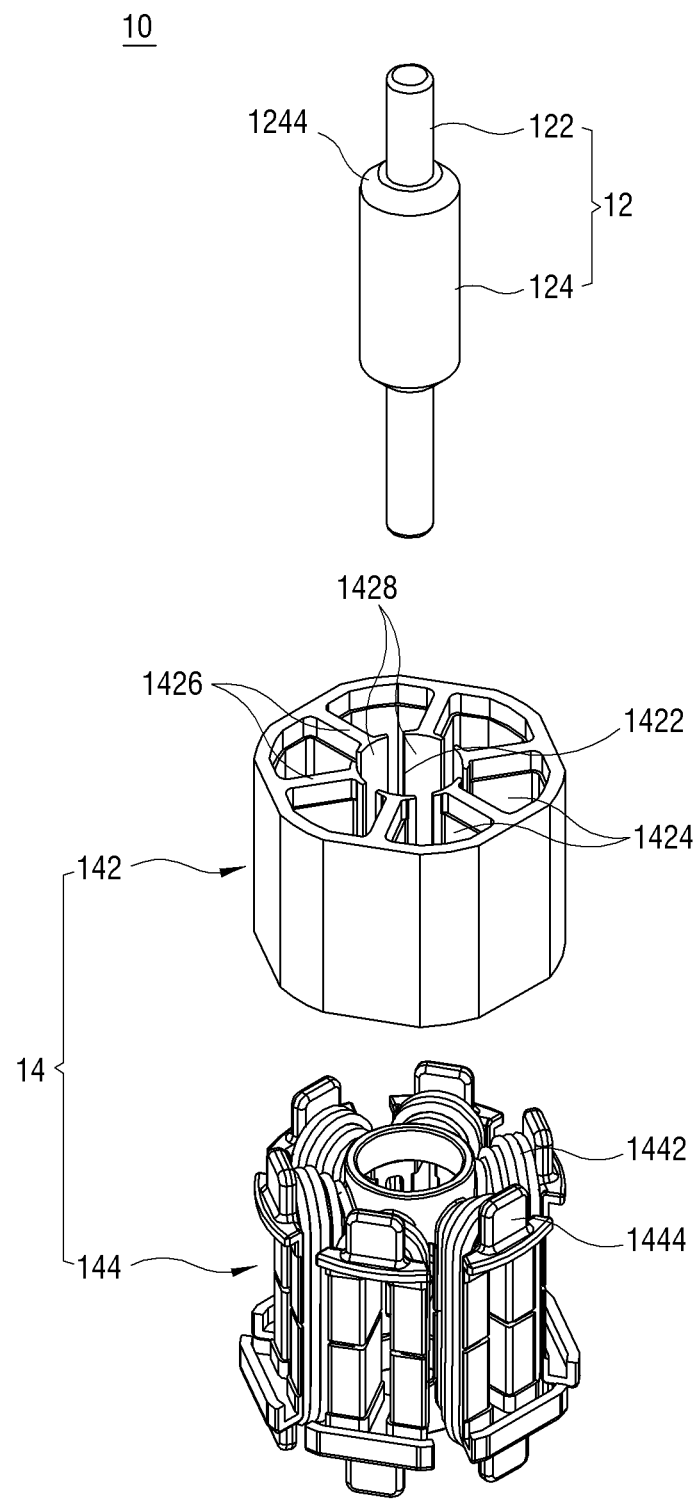
FIG. 3 is an exploded perspective view of the BLDC motor in FIG. 2.

FIG. 3 is an exploded perspective view of the motor 10 in FIG. 2.

Referring to FIG. 3, the motor 10 may include the rotor 12 with the cylindrical permanent magnet 124 coupled to the shaft 122, and the stator 14 provided leaving a predetermined space from the outer circumferential surface of the permanent magnet 124 of the rotor 12.

The rotor 12 may include the shaft 122 serving as a spindle, and the cylindrical permanent magnet 124. The rotor 12 may be supported to turn around the shaft 122.

The shaft 122 may be firmly coupled into the hollow of the cylindrical permanent magnet 124 by adhesive or glue.

The permanent magnet 124 may be shaped like a cylinder, and include a stress reducing portion 1244 provided at opposite end portions along an axial direction and having a shape to reduce mass defined corresponding to centrifugal stress caused by high-speed spinning.

The permanent magnet 124 may include at least one of an alnico magnet, a ferrite magnet, a neodymium magnet or a samarium cobalt magnet.

According to an alternative embodiment, the rotor 12 may further include a rotor core between the shaft 122 and the permanent magnet 124.

The stator 14 may include a stator yoke 142 and a coil assembly 144.

The stator yoke 142 refers to an iron core which may for example be made of silicon steel, and may include a rotor inserting portion 1422 in which the rotor 12 is centrally positioned; slots 1424, for example, six slots 1424 in which the coil assembly 144 is settled; a plurality of teeth 1426 provided between adjacent slots 1424; and a plurality of shoes 1428 provided at an end portion of the tooth 1426 and facing toward the rotor inserting portion 1422.

Each slot 1424 refers to a space in which a winding coil 1442 is placed.

Each wound coil of the winding coil 1442 is positioned between two teeth 1426.

Each shoe 1428 may prevent the winding coil 1442 wound between two teeth 1426 from being separated from the tooth 1426. The shoes 1428 may be arranged along a circle in the shape of an arch having a predetermined curvature, thereby forming the rotor inserting portion 1422.

The coil assembly 144 may include the plurality of winding coils 1442 and a coil supporter 1444.

Each winding coil 1442 may be wound in between the teeth 1426 many turns, and generate the rotating magnetic field based on the electric current applied from a power supply.

The coil supporter 1444 may support the winding coil 1442 to maintain a certain shape.

The electromagnetic field generated in the stator 14 and the magnetic field of the permanent magnet 124 of the rotor 12 interact with each other to produce a repulsive force or an attractive force, thereby causing the rotor 12 to spin.

Figure 4:
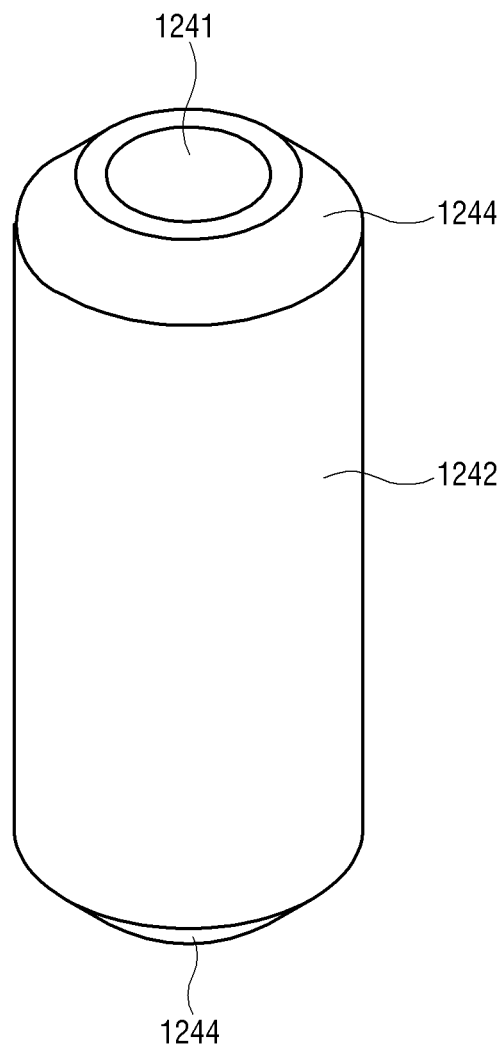
FIG. 4 is a perspective view of the permanent magnet in FIG. 2.
Figure 5:
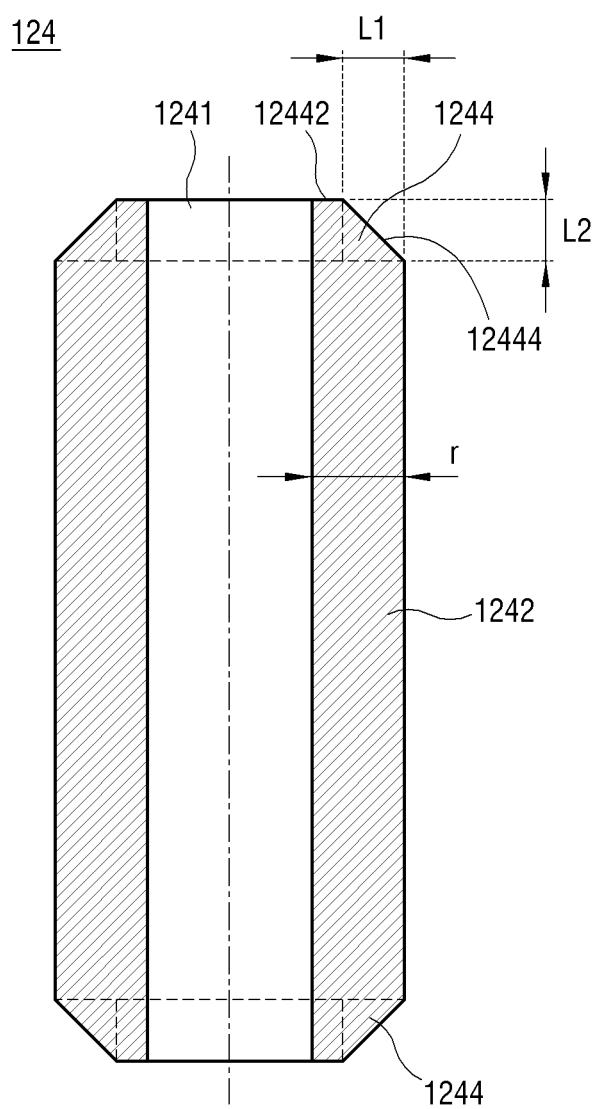
FIG. 5 is a cross-section view of the permanent magnet in FIG. 2.

FIGS. 4 and 5 are a perspective view and a cross-section view of the permanent magnet 124 of the rotor according to the first embodiment of the disclosure, respectively.

Referring to FIGS. 4 and 5, the permanent magnet 124 is shaped like a cylinder, and may include a magnet main body 1242 having a hollow 1241 into which the shaft 122 (see FIG. 3) is centrally inserted and coupled, and a stress reducing portion 1244 provided at opposite end portions of the magnet main body 1242.

The magnet main body 1242 has a cylindrical shape with an even thickness r so that its mass can be uniform in a radial direction.

The stress reducing portion 1244 may have a shape 12444 of which mass or volume per unit length in the axial direction of the magnet main body 1242 is decreased to reduce the centrifugal stress due to spinning at the opposite end portions of the magnet main body 1242.

The mass or volume decreasing shape 12444 may have a length L1 in the radial direction, which is greater than or equal to one third of the thickness r in the radial direction of the magnet main body 1242. When the length L1 of the mass or volume decreasing shape 12444 is equal to the thickness r of the magnet main body 1242, there may be no end surfaces 12442.

The mass or volume decreasing shape 12444 may have a length L2 in the axial direction, which is greater than or equal to one third of the thickness r in the radial direction of the magnet main body 1242. Although there are no limits to the length L2 of the mass or volume decreasing shape 12444, the length L2 of the mass or volume decreasing shape 12444 equal to the thickness r of the magnet main body 1242 is proper when deterioration in performance of the permanent magnet is taken into account.

The mass or volume decreasing shape 12444 may have a tapering shape inclined from the outer circumferential surface of the magnet main body 1242 toward the axial-directional end portion.

The tapering shape may be linearly inclined from the outer circumferential surface of the permanent magnet 124 toward the axial-directional end portion.

According to an alternative embodiment, the mass or volume decreasing shape 12444 may have a stepwise tapering shape inclined from the outer circumferential surface of the magnet main body 1242 toward the axial-directional end portion.

Figure 6:
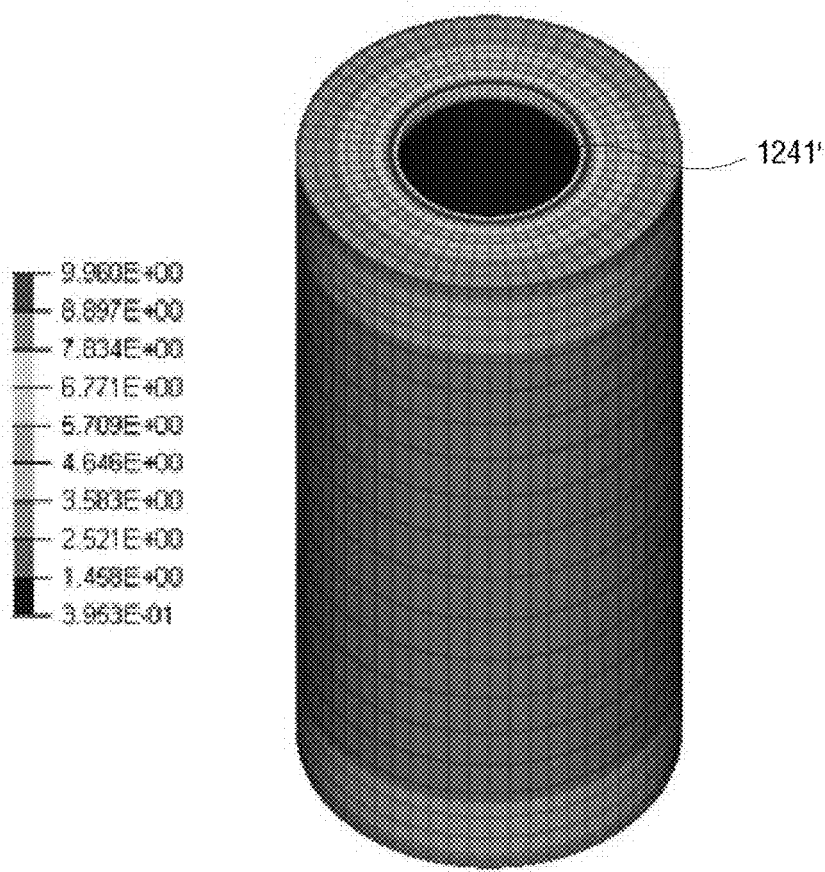
FIG. 6 is a simulation view showing a stress distribution based on a centrifugal stress applied to a conventional permanent magnet.

FIG. 6 is a simulation view showing a stress distribution based on a centrifugal stress applied to a conventional permanent magnet 124'. The conventional permanent magnet 124' has an even thickness of 2 mm in the radial direction throughout along the axial direction.

Referring to FIG. 6, when the motor 10 employing the conventional permanent magnet 124' runs at 150,000 RPM, it will be appreciated that stress not less than about 10 MPa is focused on the opposite end portions of the permanent magnet 124', in particular, an end portion edge adjacent to the hollow 1241'. Such focused centrifugal stress may break and scatter the end portion edge adjacent to the hollow 1241'.

The centrifugal stress is caused by a centripetal force F. The centripetal force F may be obtained by $mr\omega^2$, where m is mass per unit length in the axial direction of the permanent magnet 124, r is a radius, and $\omega$ is an angular velocity.

In result, as shown in FIG. 6, to reduce the centrifugal stress focused on the hollow edge inside the opposite end portions, there is a need of decreasing the mass (m), the radius (r), and the angular velocity ($\omega$). However, performance is deteriorated when the radius (r) and the angular velocity ($\omega$) of the permanent magnet 124 are decreased, and it is thus impossible to decrease the radius (r) and the angular velocity ($\omega$). Therefore, there is a need of decreasing the mass or volume of the end portions on which the centrifugal stress is focused.

Figure 7:
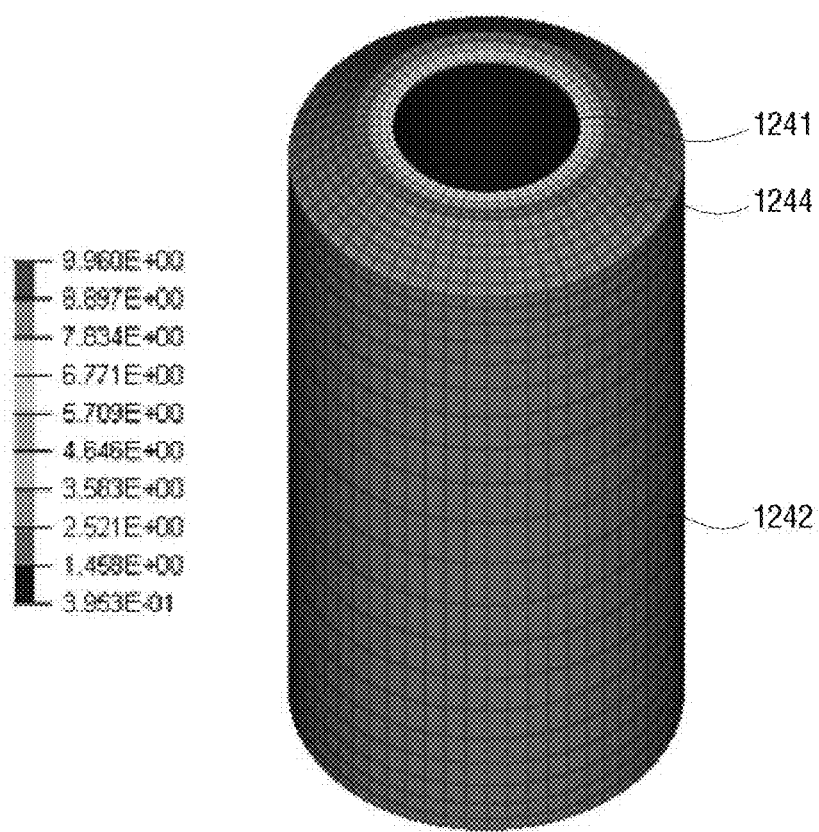
FIG. 7 is a simulation view showing a stress distribution based on a centrifugal stress applied to the permanent magnet according to the first embodiment of the disclosure.

FIG. 7 is a simulation view showing a stress distribution based on a centrifugal stress applied to the permanent magnet 124 according to the first embodiment of the disclosure. The permanent magnet 124 according to the first embodiment of the disclosure has a thickness of 2 mm in the radial direction of the magnet main body 1242, and includes the stress reducing portion 1244 shared to reduce the mass based on the centrifugal stress at the opposite end portions of the magnet main body 1242. In this case, the mass reducing shape of the stress reducing portion 1244 has a first length L1 of 1.5 mm in the radial direction and a second length L2 of 1.5 mm in the axial direction, which are three fourths of the thickness in the radial direction.

Referring to FIG. 7, when the motor 10 employing the permanent magnet 124 according to an embodiment of the disclosure runs at 150,000 RPM, it will be appreciated that stress is reduced to be not more than about 8 MPa on the opposite end portions of the permanent magnet 124, in particular, an end portion edge adjacent to the hollow 1241. Such reduced centrifugal stress was reduced by not less than about 20% as compared with the conventional stress.

Figure 8:
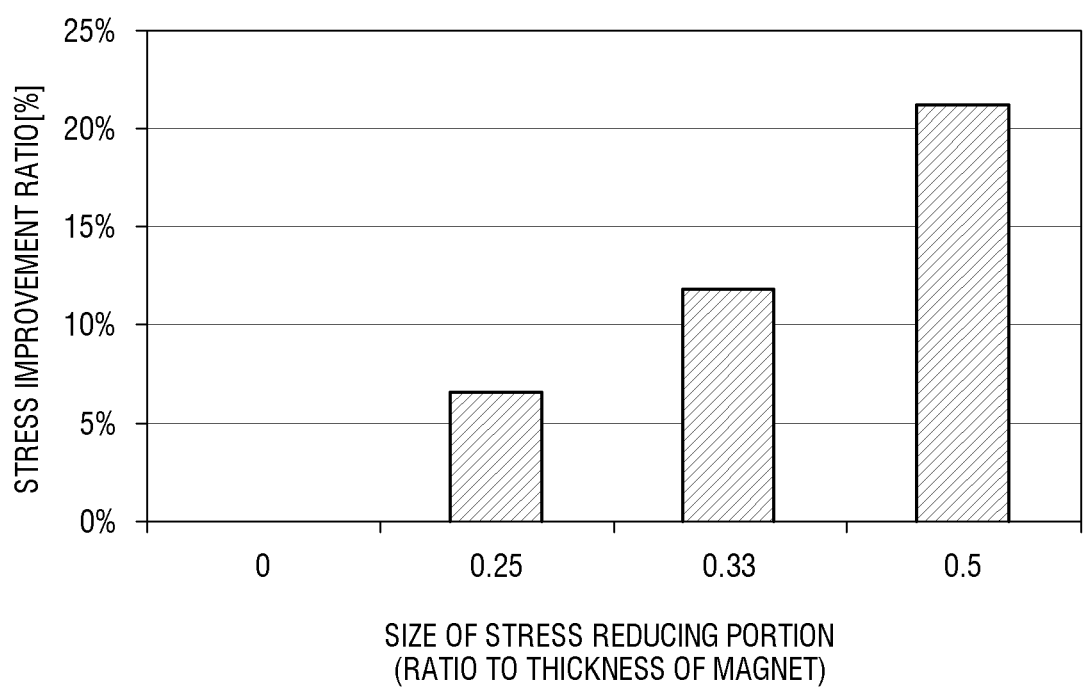
FIG. 8 is a graph of centrifugal-stress improvement ratios based on the size of a mass reducing shape of a stress reducing portion.

FIG. 8 is a graph showing centrifugal-stress improvement ratios (%) based on the length of the mass reducing shape of the stress reducing portion 1244. Here, the graph means that the mass or volume of the stress reducing portion 1244 is reduced as the length of the mass reducing shape 12444 of the stress reducing portion 1244 increases.

Referring to FIG. 8, the stress improvement ratio was 6% when the length of the mass reducing shape 12444 of the stress reducing portion 1244, in other words, the first length L1 in the radial direction and the second length L2 in the axial direction are equal to one fourth of the thickness of the magnet main body 1242 of the permanent magnet 124. In addition, the stress improvement ratio was 12% at one third, and 21% at one half. Therefore, the stress improvement ratio of 6% is somewhat insufficient to prevent the permanent magnet 124 from being broken and scattered, and thus the first length L1 in the radial direction and the second length L2 in the axial direction may be formed to be not less than one third of the thickness of the magnet main body 1242 of the permanent magnet 124 so as to show the stress improvement ratio of not less than 10%. Of course, such a stress improvement ratio may be varied depending on various characteristics such as the kind, size, RPM, etc. of the permanent magnet 124. However, specifically, when a motor using the permanent magnet or an electronic apparatus using the motor is commercialized as a product, the stress improvement ratio may be designed enough to satisfy a consumer of the product, Therefore, the first length L1 or the second length L2 may be selected within a range of ⅓ to 1 of the thickness of the magnet main body 1242 in order to guarantee a safety rate of 2.0 based on a range of use, i.e. a range of RPM or a diameter range of the permanent magnet 124. The safety rate of 1.0 shows a level designed not to be broken at 100,000 RPM or higher corresponding to the range of using the cleaner. However, the permanent magnet 124 having the safety rate of 1.0 is likely to be broken due to various factors, and the permanent magnet 124 is thus required to have the safety rate of 2.0 or higher.

FIGS. 9 and 10 are tables showing safety rates based on the ratios of the first length L1 in the radial direction and the second length L2 in the axial direction of the mass reducing shape 12444 at 150,000 RPM and 130,000 RPM.

Referring to FIG. 9, when the first length L1 and the second length L2 are 0:0 (the related art), the stress was 18.2 MPa and the safety rate was 1.10. When the first length L1 and the second length L2 are 1.5 mm:1.5 mm (the disclosure), the stress was 10.4 MPa and the safety rate was 1.92. With this, it will be understood that the permanent magnet 124 including the stress reducing portion 1244 according to the disclosure is significantly improved in the stress and the safety rate. At 150,000 RPM, when the second length L2 is gradually decreased up to 0.9 mm with the constant first length L1, the stress was increased and the safety rate was decreased.

Referring FIG. 10, when the first length L1 and the second length L2 are 0:0 (the related art), the stress was 13.67 MPa and the safety rate was 1.46. When the first length L1 and the second length L2 are 1.5 mm:1.5 mm (the disclosure), the stress was 7.81 MPa and the safety rate was 2.56. With this, it will be understood that the permanent magnet 124 including the stress reducing portion 1244 according to the disclosure is more significantly improved in the stress and the safety rate than those of FIG. 9. At 130,000 RPM, when the second length L2 is gradually decreased up to 0.9 mm with the constant first length L1, the stress was maintained to be not more than 10 MPa and the safety rate was maintained to be not less than 2.0.

Figure 11:
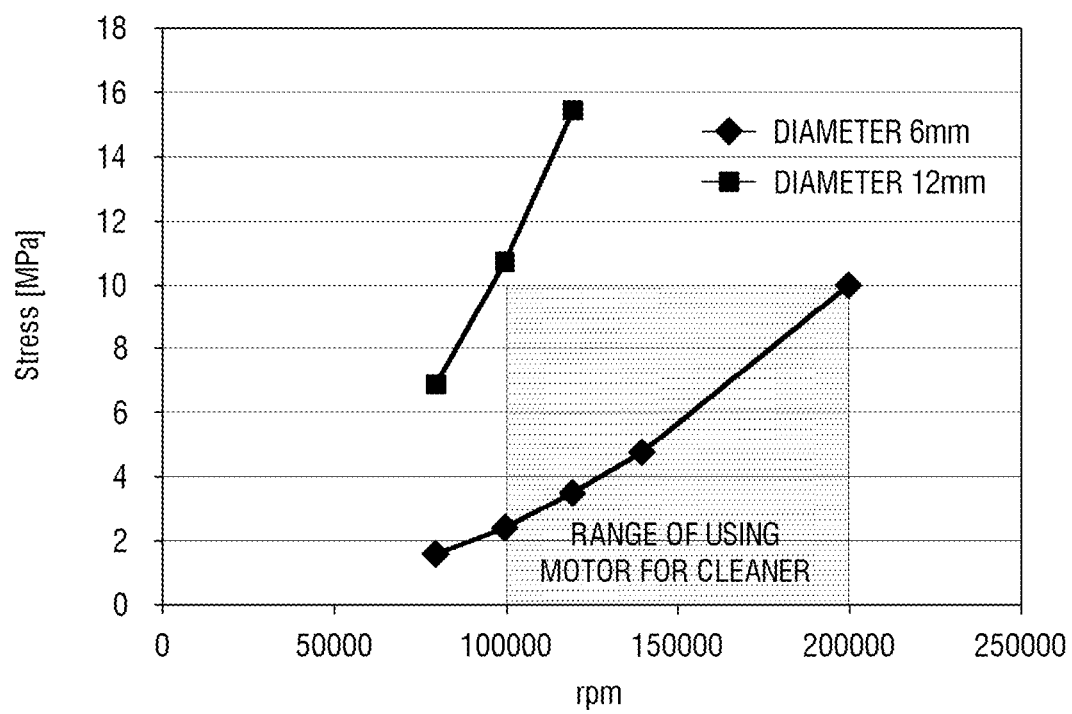
FIG. 11 is a graph showing a relationship between RPM and stress of a rotor according to diameters of a permanent magnet.

FIG. 11 is a graph showing a relationship between RPM and stress of the rotor 12 according to diameters of the permanent magnet 124.

Within a range of using the motor for the cleaner, i.e. 100,000~200,000 RPM, when the permanent magnet 124 has a diameter of 12 mm, the stress exceeds 10 MPa. On the other hand, when the diameter of the permanent magnet 124 is 6 mm at the range of using the motor for the cleaner, i.e. 100,000~200,000 RPM, the centrifugal stress may have a safety value of not more than 10 MPa and the safety rate of not less than 2.0.

Further, the ratio of the first length L1 and the second length L2 may be selected based on the range of use, i.e. the range of RPM.

Further, the diameter of the permanent magnet 124 may be properly selected within the range of 6~12 mm based on the range of use, i.e. the range of RPM.

Figure 12:
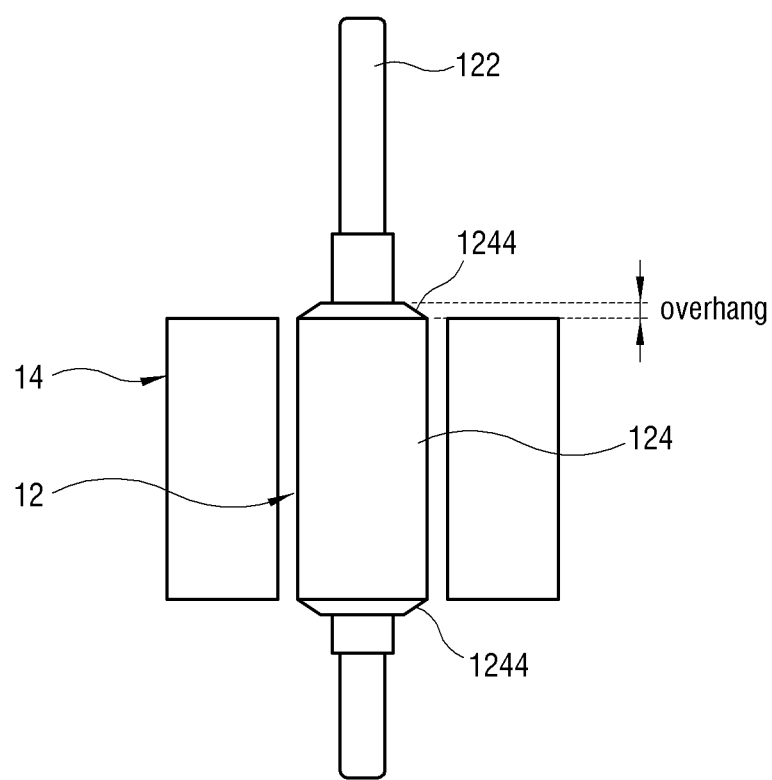
FIG. 12 is a schematic diagram of a rotor and a stator in a motor according to a second embodiment of the disclosure.

FIG. 12 is a schematic diagram of the rotor 12 and the stator 14 in the motor 10 according to a second embodiment of the disclosure.

Referring to FIG. 12, the stress reducing portion 1244 may be provided in an overhang portion over the axial-direction end portion of the stator 14. Of course, the stress reducing portion 1244 may be not only provided in the overhang portion but also overlapped inside the stator 14.

Figure 13:
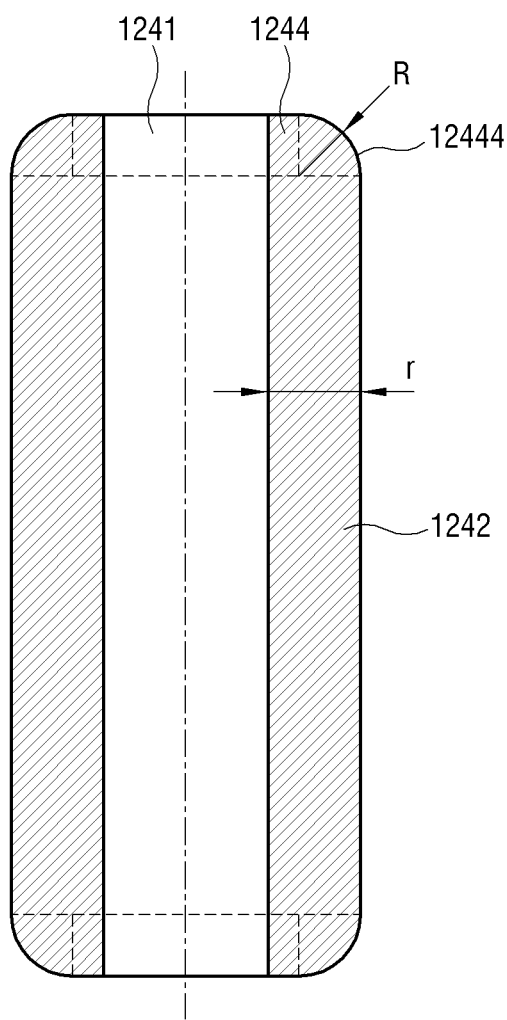
FIG. 13 is a cross-section view of a permanent magnet according to a third embodiment of the disclosure.

FIG. 13 is a cross-section view of the permanent magnet 124 according to a third embodiment of the disclosure.

Referring to FIG. 13, the stress reducing portion 1244 may have a shape 12444 of which mass or volume is more reduced than a unit length in the axial direction of the magnet main body 1242.

The mass or volume decreasing shape 12444 may include a tapering shape inclined from the outer circumferential surface of the magnet main body 1242 toward the axial-direction end portion with a predetermined radius curvature R.

The radius curvature R may be greater than or equal to one third of the thickness r in the radial direction of the magnet main body 1242.

The radius curvature R may include complex curvatures.

Figure 14:
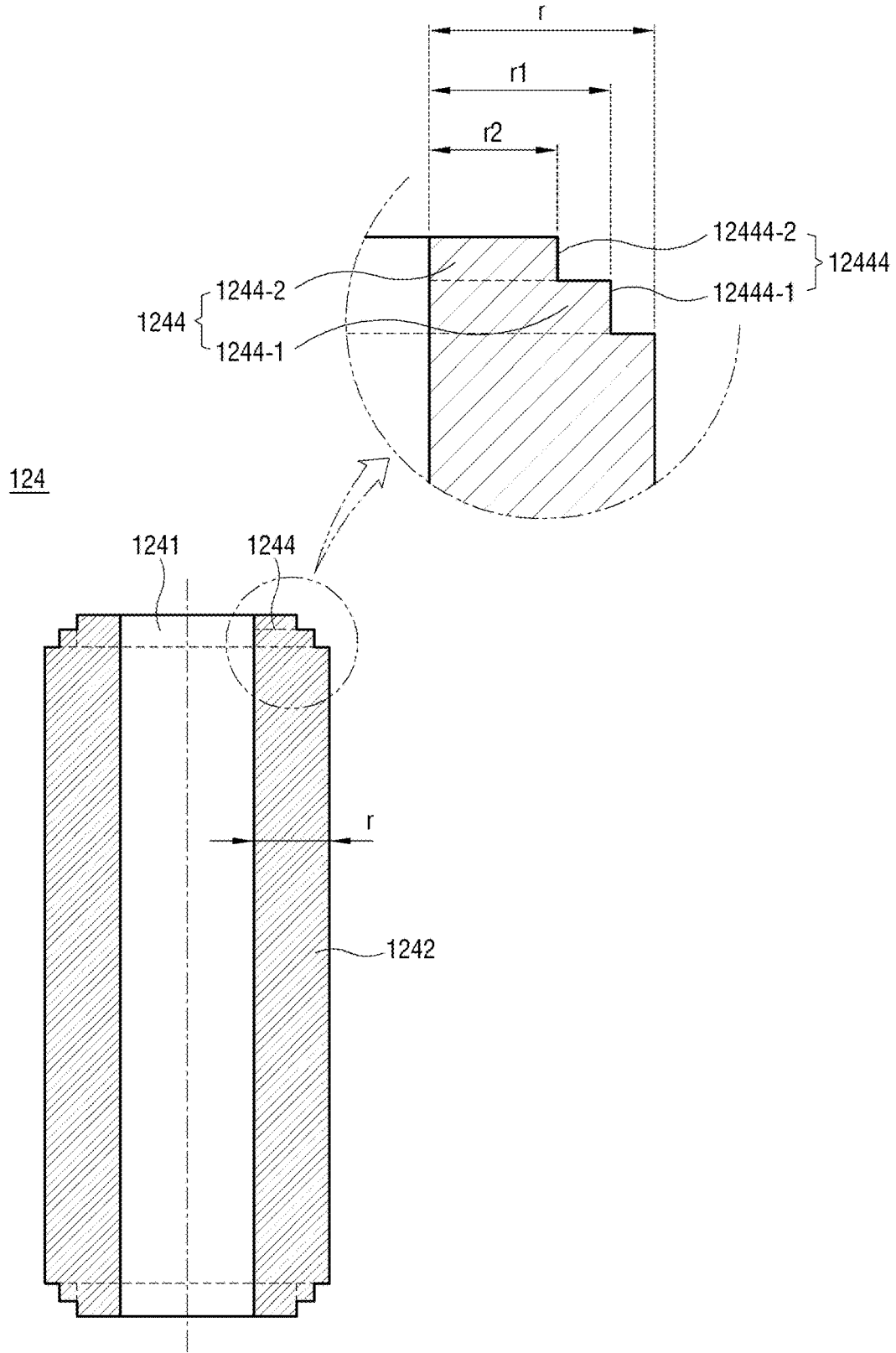
FIG. 14 is a cross-section view of a permanent magnet according to a fourth embodiment of the disclosure.

FIG. 14 is a cross-section view of the permanent magnet 124 according to a fourth embodiment of the disclosure.

Referring to FIG. 14, the stress reducing portion 1244 may have a shape 12444 of which mass or volume is more reduced than a unit length in the axial direction of the magnet main body 1242.

The stress reducing portion 1244 may include first and second stress reducing portions 1244-1 and 1244-2 different in thickness in the radial direction.

A first stress reducing portion 1244-1 may have a first shape 12444-1 extended evenly having a thickness r1 smaller than the thickness r of the magnet main body 1242.

A second stress reducing portion 1244-2 may have a second shape 12444-2 extended evenly having a thickness r2 smaller than the thickness r1 of the first stress reducing portion 1244-1.

Here, the stress reducing portion 1244 includes two, i.e. first and second stress reducing portions 1244-1 and 1244-2, but this is merely an example. Alternatively, the stress reducing portion 1244 may be formed with three or more portions.

Figure 15:
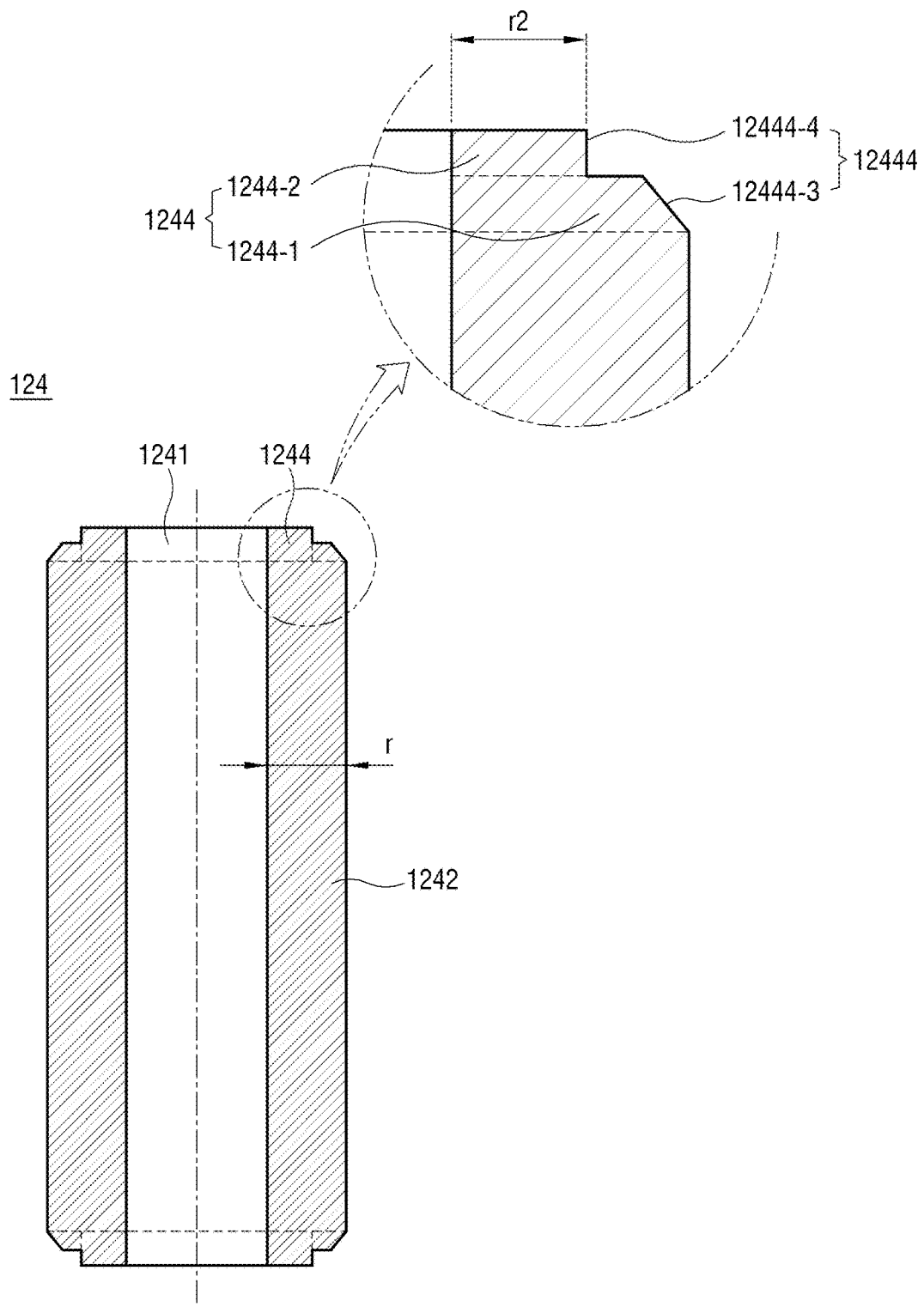
FIG. 15 is a cross-section view of a permanent magnet according to a fifth embodiment of the disclosure.

FIG. 15 is a cross-section view of the permanent magnet 124 according to a fifth embodiment of the disclosure.

Referring to FIG. 15, the stress reducing portion 1244 may have a shape 12444 of which mass or volume is more reduced than a unit length in the axial direction of the magnet main body 1242.

The stress reducing portion 1244 may include first and second stress reducing portions 1244-1 and 1244-2 different in diameter from each other.

The first stress reducing portion 1244-1 may include a third shape 12444-3 inclined from the outer circumferential surface of the magnet main body 1242 in the axial direction.

The second stress reducing portion 1244-2 may include a fourth shape 12444-4 extended from the first stress reducing portion 1244-1 evenly having a thickness r2.

As described above, the BLDC motor according to the disclosure can prevent the permanent magnet having a diameter of 6 mm or greater from being broken and scattered even while running at 100,000 RPM or higher.

The BLDC motor according to the disclosure has high performance, is lightweight, guarantees a safety rate of 2.0 or higher, and is manufactured with low costs.

Although a few embodiments of the disclosure have been described in detail, various changes can be made in the disclosure without departing from the scope of claims.

What is claimed is:

1. A brushless direct current (BLDC) motor comprising:
a rotor comprising a shaft and a permanent magnet having a hole through which the shaft extends, the permanent magnet configured to rotate on the shaft; and
a stator surrounding at least a portion of the rotor and comprising a wound coil configured to generate an electromagnetic field,
the permanent magnet comprising an undivided cylindrical magnet main body having cutout portions formed therein at outer sides of opposite end portions in an axial direction of the cylindrical magnet main body, each of the cutout portions having a shape such that a mass or a volume per unit length in an axial direction of each of the cutout portions is less than a mass or a volume per unit length in the axial direction of the cylindrical magnet main body, to reduce centrifugal stress caused by rotation of the permanent magnet,
wherein each of the cutout portions provided at the outer sides of the opposite end portions of the cylindrical magnet main body has a length in a radial direction, which is greater than or equal to one third of a thickness of the cylindrical magnet main body, in the radial direction, and
wherein each of the cutout portions includes a first stepped portion and a second stepped portion.

2. The BLDC motor according to claim 1, wherein the rotor is configured to rotate at 100,000 or more revolutions per minutes (RPM).

3. The BLDC motor according to claim 1, wherein the permanent magnet has a diameter greater than or equal to 6 mm and less than or equal to 12 mm.

4. The BLDC motor according to claim 1, wherein each of the cutout portions provided at the opposite end portions of the cylindrical magnet main body has a length in the axial direction, which is greater than or equal to one third of a thickness of the cylindrical magnet main body, in the radial direction.

5. The BLDC motor according to claim 1, wherein each of the cutout portions provided at the opposite end portions has a first shape evenly extended with a first thickness less than a thickness of the cylindrical magnet main body in a radial direction of the permanent magnet, and a second shape evenly extended with a second thickness less than the first thickness.

6. The BLDC motor according to claim 1, wherein each of the cutout portions provided at the opposite end portions has a first shape evenly extended with a first thickness smaller than thickness of the cylindrical magnet main body in a radial direction of the permanent magnet, and a second shape inclined toward an axial-direction end portion.

7. The BLDC motor according to claim 1, wherein an axial-direction end of each of the cutout portions overhangs an axial-direction end portion of the stator.

8. The BLDC motor according to claim 1, wherein a value of the centrifugal stress is not more than 10 MPa.

9. A brushless direct current motor comprising:
a stator including a wound coil configured to generate an electromagnetic field; and
a rotor electromagnetically coupled to the stator, the rotor comprising a shaft and a permanent magnet having a hole through which the shaft extends and being configured to rotate, the permanent magnet comprising an undivided cylindrical magnet main body having first and second cutout portions formed therein at outer sides of opposite ends in an axial direction of the cylindrical magnet main body, and each of the first and second cutout portions comprising a cutout portion having a shape such that at least one of a mass or a volume per unit length in an axial direction of each of the first and second cutout portions, is less than a mass or a volume per unit length in the axial direction of the cylindrical magnet main body to reduce centrifugal stress caused by rotation of the permanent magnet,
wherein each of the first and second cutout portions provided at the outer sides of the opposite end portions of the cylindrical magnet main body has a length in a radial direction, which is greater than or equal to one third of a thickness of the cylindrical magnet main body, in the radial direction, and
wherein each of the first and second cutout portions includes a first stepped portion and a second stepped portion.

10. The brushless direct current motor according to claim 9, wherein each of the first and second cutout portions has a length in the axial direction which is greater than or equal to one third of a thickness of the cylindrical magnet main body, in the radial direction.

11. The brushless direct current motor according to claim 9, wherein each of the first and second cutout portions has a first shape evenly extended with a first thickness less than a thickness of the magnet main body in a radial direction of the permanent magnet, and a second shape evenly extended with a second thickness less than the first thickness.

12. A brushless direct current motor comprising:
a stator including a wound coil configured to generate an electromagnetic field; and
a rotor electromagnetically coupled to the stator, the rotor comprising a shaft and a permanent magnet having a hole through which the shaft extends and being configured to rotate in response to the electromagnetic field, the permanent magnet comprising an undivided cylindrical magnet main body having first and second cutout portions found therein at outer sides of opposite ends of the cylindrical magnet main body, each of the first and second cutout portions having a volume shape having a length in a radial direction which is greater than or equal to one third of the thickness in the radial direction of the cylindrical magnet main body to reduce centrifugal stress caused by rotation of the permanent magnet, wherein each of the first and second cutout portions includes a first stepped portion and a second stepped portion.

\* \* \* \* \*